Oct. 24, 1933. E. M. WICHERT Re. 18,973

AUTOMATICALLY ADJUSTABLE CONTINUOUS BRIDGE

Original Filed Nov. 29, 1929

INVENTOR
Ernest M. Wichert
By Green & McCallister
His Attorneys

Reissued Oct. 24, 1933 Re. 18,973

UNITED STATES PATENT OFFICE 18,973

AUTOMATICALLY ADJUSTABLE CONTINUOUS BRIDGE

Ernest M. Wichert, Wilkinsburg, Pa., assignor to The Wichert Continuous Bridge Corporation, a corporation of Pennsylvania Original No. 1,842,136, dated January 19, 1932, Serial No. 410,568, November 29, 1929. Application for reissue May 26, 1933. Serial No. 673,123

10 Claims. (Cl. 14—4)

This invention relates to bridges, particularly to highway bridges. The constant public demand for increased facilities of transportation, has brought about such changes within the last two decades, that many of the older bridges are unable to take care of the increased weights, volume and speed of modern traffic. This, ever increasing volume of traffic, necessitates rebuilding of old bridges, and the construction of many additional new ones.

It is a well known fact that the present generation desires all important structures to be of pleasing appearance and to be built with materials which are fire-proof and durable; in addition, future increase in traffic, must be anticipated. The bridge engineer naturally utilizes those building materials which in addition to the stated requirements, will assure the greatest economy and efficiency. For long span bridges the materials are steel for the carrying members and a reinforced concrete slab instead of the wooden floor in older bridges. This concrete floor constitutes the largest single item, of the many, which have increased the total load of a modern bridge.

Of all the known types of bridges the continuous type is theoretically best suited to carry the heavy loads; its advantages over simple span construction effect savings of from fifteen percent to thirty percent, depending on number and lengths of spans. However, the present known rigid type of continuous bridge is only practical under certain favorable conditions, a few of these are: 1, non-yielding foundation, 2, low piers, 3, long spans, 4, approximately equal spans, 5, moderately low trusses.

Generally stated the main object of this invention is to create a new type of continuous bridge, possessing all the advantages which the present known rigid construction has over all other types and being superior to the usual rigid continuous bridge in not requiring special favorable conditions and in effecting further economy.

The following will state more clearly the major objects which this invention intends to attain.

*Object A.*—To construct, connect and support a continuous bridge consisting of two or more spans in such manner that the weight of the bridge (reaction) is utilized to decrease the stresses in the bridge by an arbitrarily fixed and predetermined percentage of the weight of the bridge, thereby permitting smaller bridge members and consequently producing a more economical bridge.

*Object B.*—To construct, connect and support two or more spans in such manner as to make these spans continuous over three or more supports, yet so flexible at points of support that unequal pier or abutment settlements will effect no detrimental stress changes in the bridge members, in contradistinction to the usual rigid type of continuous construction, wherein a settling of any one of the bridge supports effects more or less dangerous stress changes in the different bridge members.

*Object C.*—To construct, connect and support two or more spans in such manner as to form a continuous bridge of statically determinate character, in contradistinction of the usual rigid type of continuous construction with its static indeterminateness.

*Object D.*—To construct, connect and support two or more spans in such manner as to form a continuous bridge which will automatically equalize temperature stresses arising from temperature difference between top and bottom chords, in contradistinction to the usual rigid type of continuous bridges, wherein large temperature differences between top and bottom chords produce high temperature stresses.

*Object E.*—To construct, connect and support a continuous bridge consisting of two or more spans in such manner as to avoid troublesome, expensive and complicated pier reaction adjustments during the process of erection as is the case in the erection of the usual rigid type of continuous construction.

*Object F.*—To construct, connect and support a continuous bridge consisting of two or more spans in such manner that a girder or truss, of constant moment of inertia, will permit the designing engineer to arbitrarily locate the points of contraflexure at such distances between supports as will permit an equalization of positive and negative bending moment under any given load condition, thereby producing a smaller maximum bending moment and a span of larger carrying capacity, in contradistinction to the usual, rigid type of continuous girder or truss with constant moment of inertia, wherein the points of contraflexure are inherently fixed.

*Object G.*—To construct, connect and support a continuous bridge, consisting of two or more spans in such manner as to share with the usual type of continuous and cantilever bridges the advantage over simple span construction of erecting one or more spans without the use of false work.

*Object H.*—To construct, connect and support a continuous bridge, consisting of two or more spans, in such manner as to effect more rigidity under traffic than is obtainable with the usual type of cantilever bridge.

*Object I.*—To construct, connect and support a continuous bridge, consisting of two or more spans so as to require less or no such extra material as is required in the erection of a cantilever bridge of usual type.

*Object J.*—To construct, connect and support a continuous bridge consisting of two or more spans so as to eliminate abrupt stress changes under traffic such as occur in the usual type of cantilever bridge.

*Object K.*—To construct, connect and support a continuous bridge consisting of two or more spans so as to obtain better distribution of stresses, under unequal loading and under moving, concentrated loads, than is obtainable in the usual type of cantilever bridge.

*Object L.*—To construct, connect and support a continuous bridge consisting of two or more spans in such manner as to produce no or less reversal stresses in the finished structure than are obtainable in either, the usual, rigid type of continuous or cantilever bridges.

*Object M.*—To construct, connect and support a continuous bridge consisting of two or more spans, in such manner as to require less additional sectional area in certain bridge members to provide for erection stresses, especially in case one or more spans are erected without the use of false work in contradistinction to the usual, rigid type of continuous bridges, or the usual type of cantilever bridges with their inherently non-uniform and heavier individual bridge members, which require heavier erection equipment than that required in the erection of a bridge designed and fabricated in accordance with the specification of this invention.

*Object N.*—To construct, connect and support a continuous bridge, consisting of two or more spans, which will be less affected by wind and impact than the usual cantilever bridge, therefore requiring less steel to provide for wind and impact stresses.

This invention attains all the above mentioned objects by employing the following described and diagrammatically illustrated methods in constructing, connecting and supporting a continuous bridge.

In the accompanying drawing, wherein similar numerals refer to similar parts throughout the several views.

Figures 1, 2, 3, 4, 5, 6:
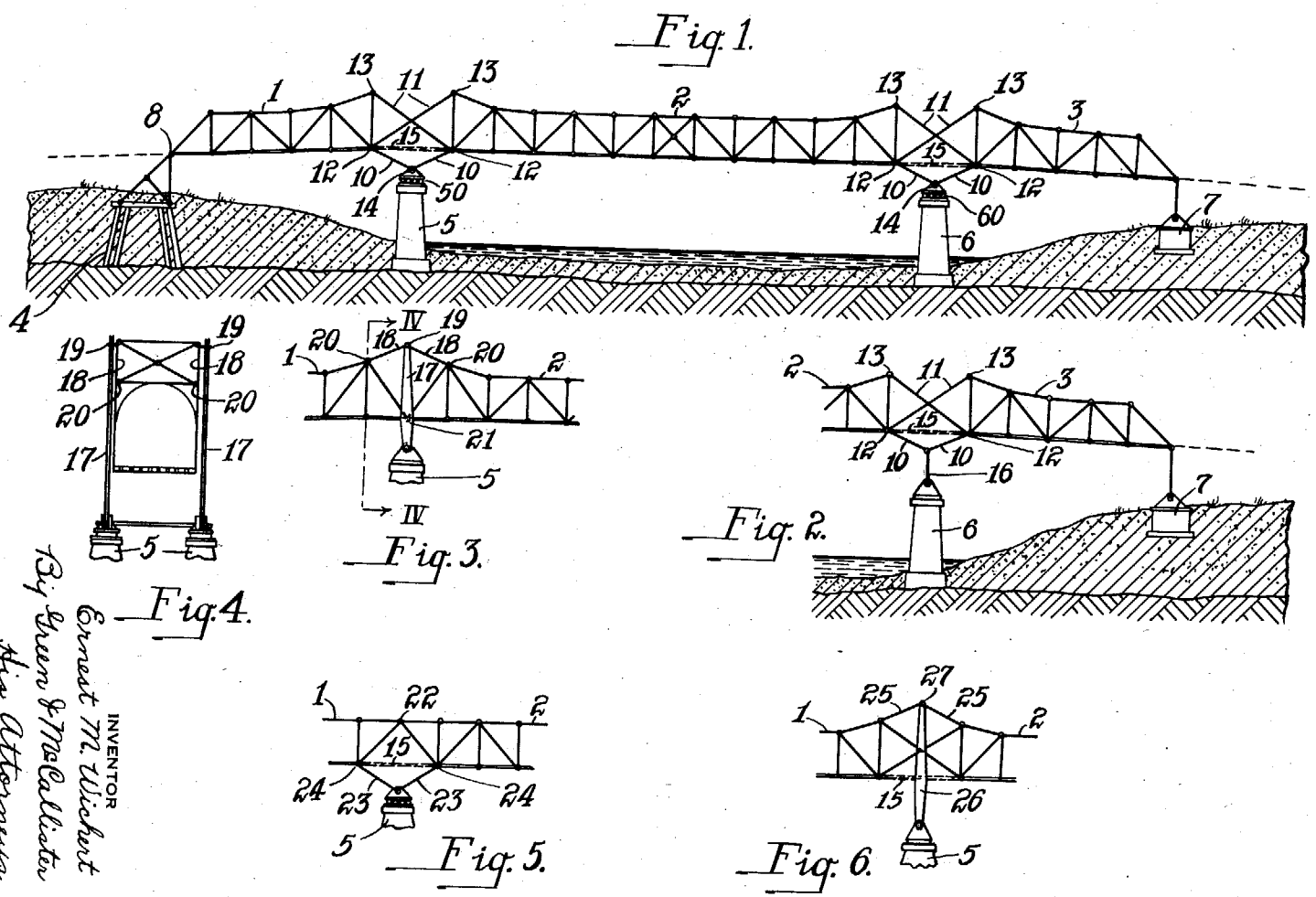
Figure 1 is a side elevation of a bridge embodying my present invention.
Fig. 2 is a fragmentary view similar to Fig. 1 showing a modification.
Fig. 3 is a fragmentary elevation of another modification.
Fig. 4 is an enlarged cross-sectional view on line IV—IV of Fig. 3.
Fig. 5 illustrates a further modification.
Fig. 6 illustrates a still further modification.

For example, in Fig. 1 of the accompanying drawing, are shown three connected spans 1, 2 and 3 forming a continuous bridge. These spans are supported by abutments 4, piers 5 and 6 and end bent 7. At abutment 4, one end of the bridge is secured against horizontal movement by means of a pin 8 in each truss. At piers 5 and 6, roller bearings 50 and 60 provide freedom for longitudinal movement. Likewise end bent 7, being of the rocker type provides this function. At piers 5 and 6 the lower chords of spans 1 and 2, 2 and 3 respectively, terminate in inclined struts 10, which are connected to tension bars 11, by means of a pin 12, the other ends of tension bars 11 being connected to the rigid section of the upper chords of spans 1 and 2, 2 and 3, respectively, by means of a pin 13. The lower ends of struts 10 are connected with bearing pin 14.

It will be evident that the inclined struts 10, sustaining the weight of the bridge (pier reaction) resolve their resultant stress into vertical components equal to the total reaction, and into horizontal components which will vary with the angle of inclination of the struts. Thus, the designing engineer is enabled arbitrarily to impart that compression and tension to the bottom and top chords respectively, which will locate the points of contraflexure so as to produce the smallest amount of reversal stresses or result in the most economical bridge, thereby attaining objects A, F, and L, above described.

Again referring to Fig. 1 of the accompanying drawing, it is obvious that unequal settlement of any of the supports will cause the bridge automatically to adjust itself. The following example will clearly illustrate this function. A settlement of pier 5 will produce a slight increase of the inner angle formed by struts 10 of pier 5, causing a slight increase in the distance between pins 12 of pier 5 and a corresponding slight decrease in the distance between pins 13 of pier 5. This settlement of pier 5 will produce a simultaneous, automatic adjustment in corresponding members of pier 6; except that these members will move in opposite directions, that is, the inner angle formed by struts 10 of pier 6 will be slightly decreased causing a slight decrease in the distance between pins 12 of pier 6 and a corresponding slight increase in the distance between pins 13 of pier 6. Pin 8, which secures one end of the bridge against horizontal movement to prevent horizontal displacement when acted upon by wind and traction forces enables span 1 freely to pivot about this point in case of unequal settlement of abutment 4 and pier 5. As piers 5 and 6 and end bent 7 provide for roller and rocker motion respectively, it is obvious that the bridge can expand and contract in a longitudinal direction whenever actuated by changes in temperatures or by unequal settlement of any of the bridge supports. One end of the floor section 15 between pins 12 can be fixed to either one of the floor beams located at these panel points, the other end being carried on a bracket or other suitable support with provision for sliding in case the distance between pins 12 increases or decreases, due to unequal settlement of the bridge supports. This floor section 15 may also be fixed at each of its ends and provided with an independent support and expansion joint on the center line of piers 5 and 6.

Calculations will show, that a bridge of a given height of truss and given lengths of spans can be built in accordance with the above description, which will be less affected by a settlement of one-foot in any support than the effect produced by the settling of one inch in any support in a continuous bridge of the usual rigid type, having the same given height of truss and the same given lengths of spans. The above described example shows clearly how objects B and C are attained.

As the effect resulting from unequal expansion and contraction in top and bottom chords due to temperature difference is similar to that resulting from unequal settlement of supports the above described example attains object D.

As adjacent spans are connected in such manner as to produce hinge actions at the supports it is evident that it will not be necessary to weigh any reactions during or after erection in order to determine initial stresses, thus accomplishing object E.

It will be understood by anyone skilled in the art of bridge erection, that either span 1 and span 3 of Fig. 1 may be erected by the use of a false work under span 2 only; or vice versa, that span 2 can be erected by the use of false work under span 1 and span 3 only, thus accomplishing object G.

It is further obvious that no extra or special members are required in a bridge constructed in accordance with specifications of my invention therefore accomplishing object I.

With further reference to the accompanying drawing, Figs. 1, 2, 3, 5 and 6 indicate clearly that adjacent spans are so connected as to make them continuous and to avoid abrupt stress changes, and giving that rigidity which is only obtainable in a continuous structure thus attaining objects H, J and K.

Again referring to the accompanying drawing, Figs. 2, 3, 4, 5 and 6 illustrate modifications of connecting two or more spans to form a continuous bridge. Fig. 2 is similar to Fig. 1 except that the bridge is supported by a rocker bent 16 in place of roller bearings 50 or 60.

Figs. 3 and 4 show rocker tower 17, supporting the bridge at the upper chord by means of tension bars 18, pin or pins 19 connecting the upper ends of tension bars 18 to the upper end of tower 17, each of the tension bars 18 having its lower end connected to the upper chords of adjacent trusses by means of a pin 20 and the lower chords of the adjacent trusses being joined together by a common pin 21. In this arrangement the tension bars 18 perform functions similar to those performed by struts 10 in Fig. 1.

Fig. 5 shows the upper chords of two adjacent trusses connected by means of a common pin 22, the lower chords connecting with the upper ends of struts 23 by means of pins 24. In this arrangement the struts 23 perform functions similar to those performed by struts 10 of Fig. 1.

Fig. 6 shows two adjacent trusses connected by tension bars 25 and suspended from pins 27 in the upper end of rocker tower 26. In this arrangement tension bars 25 perform functions similar to those performed by struts 10 in Fig. 1.

The floor sections 15 shown in Figs. 2, 5 and 6 may be provided with expansion joints and may be supported in similar manner to floor section 15 of Fig. 1.

The necessary calculations of stresses in a bridge constructed in accordance with my invention are made on the principle of the lever. The following is a very simple method of determining the stresses in a bridge as shown in Fig. 1.

*First*—Determine the pier reactions.

*Second*—Calculate the stresses induced in the three trusses as if all spans were of simple type; span 1 being supported by pins 8 and 12; span 2 being supported by pins 12 and 12; and span 3 being supported by pin 12 and end bent 7.

*Third*—Compute the stresses induced in the truss by the horizontal component forces in struts 10 and tension bars 11.

The algebraic sum of the stresses of these two calculations for each member will be the resulting stress in a continuous truss constructed and supported in accordance with my invention.

Either of the arrangements of connecting and supporting two or more spans, above described, or further suitable modifications thereof may be optionally employed by the designing engineer or by others skilled in the art of bridge construction without departing from the principles of this invention. The methods of connecting and supporting two or more spans in a manner herein described are applicable to any form of girder, beam, or truss, regardless of shape or regardless of type of web bracing employed.

It is further clear to those skilled in the art of constructing bridges that the methods of connecting and supporting spans described by my invention may be profitably employed in connecting and supporting existing bridge spans, thereby increasing their carrying capacity, without departing from the principles of this invention. It is also evident that the method of supporting spans herein described can be profitably employed by using the end reaction especially in long end spans to produce beneficial results without departing from the principles and scope of this invention.

I am aware that by the use of special, additional apparatus, weights or paraphernalia, previous attempts have been made to attain some single object of the many which this invention accomplishes and that these were made the subject of Letters Patent. Each and all such constructions I hereby disclaim, as being radically different from the principle of my invention which consists of a series of spans, so constructed, connected and supported that all the above mentioned objects are automatically attained without resort to special equipment or without the necessity of making periodic adjustments in the bridge. The chief essential difference between formerly proposed constructions and my invention is the fact that I so shape, arrange and connect those bridge members of a continuous bridge overlying the supports, that the reaction caused by the weight of the bridge will automatically produce beneficial stresses in the spans; the minimum and maximum intensity of these beneficial stresses being arbitrarily predetermined by the constructor.

What I claim as new and desire to secure by Letters Patent is:

1. A continuous bridge construction, having the end members of two adjacent spans pin-connected to each other and so arranged to form a non-rigid rhomboidal figure, two sides of said figure being those members which sustain the weight of the bridge.

2. A trussed bridge of continuous type and a support upon which at an intermediate point in its length the bridge is pivotally supported, the bridge including bottom and top chord members and the means of support including four members pivoted at their ends in quadrilateral formation and arranged with one diagonal disposed in the vertical plane of support and with the other diagonal in transverse plane, the four members constituting two pairs of members which meet in two apices, one above and the other below such transversely disposed diagonal, the upper pair of said members forming part of one of the two chord members of the bridge and the lower pair of members being pivoted to the other chord member of the bridge, the opposite pivot points of the four said members being movable in their spacing one from another.

3. The structure of claim 2, the means of support therein defined being pivoted to the bridge support.

4. The structure of claim 2, the means of support therein defined being pivotally hung from the bridge support.

5. The structure of claim 2, together with a frame pivoted upon the bridge support, the means of support defined in claim 2 being in turn pivoted in said frame.

6. A continuous bridge construction comprising pivotally connected spans, a support, and inclined weight sustaining members extending in opposite directions from the support, one such member supportingly engaging each span at a point spaced from the pivotal connection, the weight-sustaining members being pivotally connected to the spans and to the support, thereby forming a non-rigid connection between the spans, the weight of the bridge being communicated through the weight-sustaining members to the support, the weight-sustaining members being inclined at such an angle as to produce substantially the smallest amount of reversal stresses or result in substantially the most economical bridge for any given truss outline, the bridge having a floor which is discontinuous at such points as to permit of the several pivotally connected members moving relative to one another, as, for example, under changes of temperature or settlement of the support.

7. A continuous bridge construction comprising pivotally connected spans, a support, and inclined members extending in opposite directions from a point on such support, one such member supportingly engaging one of the spans at a point spaced from the pivotal connection, the other such member supportingly engaging the other span at a point spaced from the pivotal connection, the weight-sustaining members being pivotally connected to the spans and to the support, thereby forming a non-rigid rhomboidal supporting connection between the spans, the weight of the bridge being communicated through the weight-sustaining members to the support, the bridge having a floor which is discontinuous at such points as to permit of the several pivotally connected members moving relative to one another.

8. A continuous bridge construction comprising pivotally connected spans, a support, and inclined weight-sustaining members extending in opposite directions from the support, one such member supportingly engaging each span at a point spaced from the pivotal connection, the weight-sustaining members being pivotally connected to the spans and to the support, thereby forming a non-rigid connection between the spans, the weight of the bridge being communicated through the weight-sustaining members to the support, the bridge having a floor which is discontinuous at such points as to permit of the several pivotally connected members moving relative to one another.

9. A continuous bridge construction comprising two spans arranged end to end the spans being of substantially constant moment of inertia through the major portion of their lengths and being pivotally connected at their adjacent ends, a support, and inclined weight-sustaining members extending in opposite directions from the support, one such member supportingly engaging each span at a point spaced from the pivotal connection, the weight-sustaining members being pivotally connected to the spans and to the support, thereby forming a non-rigid connection between the spans, the weight of the bridge being communicated through the weight-sustaining members to the support, the weight-sustaining members being inclined at such angle as will so locate the points of contraflexure that the positive and negative bending moments will be substantially equalized, the bridge having a floor which is discontinuous at such points as to permit of pivotal movement at the pivot points.

10. A continuous bridge construction comprising end spans and at least one intermediate span, the several spans being pivotally connected end to end, the intermediate span having a substantially constant moment of inertia through the major portion of its length, supports for the bridge at the points of juncture of the spans, and inclined weight-sustaining members extending in opposite directions from the supports, there being at each such support a weight-sustaining member supportingly engaging one of the adjacent spans at a point spaced from the pivotal connection between the spans, and another weight-sustaining member supportingly engaging the other such span at a point spaced from the pivotal connection, the several weight-sustaining members being pivotally connected to the spans and to the supports, thereby forming non-rigid connections between the spans, the weight of the bridge being communicated through the weight-sustaining members to the supports, the weight-sustaining members being so inclined as to locate the points of contraflexure at such distances between the supports as will substantially equalize the positive and negative bending moment in the intermediate span, the bridge having a floor which is discontinuous at such points as to permit of pivotal movement at the pivot points.

ERNEST M. WICHERT.